(12) United States Patent
Turk (10) Patent No.: US 8,468,541 B2
(45) Date of Patent: Jun. 18, 2013

(54) EVENT DRIVEN SENDFILE

(75) Inventor: Mladen Turk, Zagreb (HR)

(73) Assignee: Red Hat, Inc., Raleigh, NC (US)

( * ) Notice: Subject to any disclaimer, the term of this patent is extended or adjusted under 35 U.S.C. 154(b) by 1417 days.

(21) Appl. No.: 11/897,070

(22) Filed: Aug. 28, 2007

(65) Prior Publication Data
US 2009/0064194 A1    Mar. 5, 2009

(51) Int. Cl.
*G06F 3/00* (2006.01)
(52) U.S. Cl.
USPC .............................. 719/310; 719/312; 719/313
(58) Field of Classification Search
USPC .......................................... 719/313, 310, 312
See application file for complete search history.

(56) References Cited

U.S. PATENT DOCUMENTS

| | | | |
|---|---|---|---|
| 5,845,280 A | 12/1998 | Treadwell, III et al. | |
| 6,226,689 B1 * | 5/2001 | Shah et al. | 719/314 |
| 6,393,477 B1 * | 5/2002 | Paxhia et al. | 709/223 |
| 6,789,133 B1 * | 9/2004 | Crandall et al. | 710/5 |
| 7,051,337 B2 * | 5/2006 | Srikantan et al. | 719/318 |
| 2002/0156897 A1 | 10/2002 | Chintalapati et al. | |
| 2003/0135538 A1 * | 7/2003 | Takeuchi et al. | 709/200 |
| 2008/0086542 A1 * | 4/2008 | Mukherjee et al. | 709/219 |

OTHER PUBLICATIONS

Stefan Savage, Eraser: A Dynamic Data Race Detector for Multithreadded Programs, 1997.*
labs.jboss.com/jbossweb/reference/arch.html; printed Mar. 29, 2007, 2 pages.
Turk, Mladen, "Introducing JBoss Web Server", *JBoss World 2005*, Sep. 10, 2005, 5 pages.
Office Action for U.S. Appl. No. 11/897,182 mailed Sep. 1, 2009.
Office Action for U.S. Appl. No. 11/897,182 mailed Mar. 24, 2010.
Office Action for U.S. Appl. No. 11/897,182 mailed Jul. 2, 2010.

* cited by examiner

*Primary Examiner* — Lechi Truong
(74) *Attorney, Agent, or Firm* — Lowenstein Sandler LLP (57) ABSTRACT

A file transfer manager for managing file transfers using the sendfile operation. The sendfile operation is optimized to minimize system resources necessary to complete the file transfer. The sendfile decreases resources required during idle times by sharing a thread with other idle sendfile operations. The sendfile operation is then assigned a worker thread when further data is ready to be transfered.

11 Claims, 5 Drawing Sheets

EVENT DRIVEN SENDFILE

TECHNICAL FIELD

Embodiments of the present invention relate to the management of the transfer of files between computers. Specifically, the embodiments relate to a method and apparatus for reducing the resources required to manage sendfile operations by assigning idle sendfile operations to a common poller thread and releasing worker threads assigned to the sendfile operations until needed for further data transfer.

BACKGROUND

Figure 1:
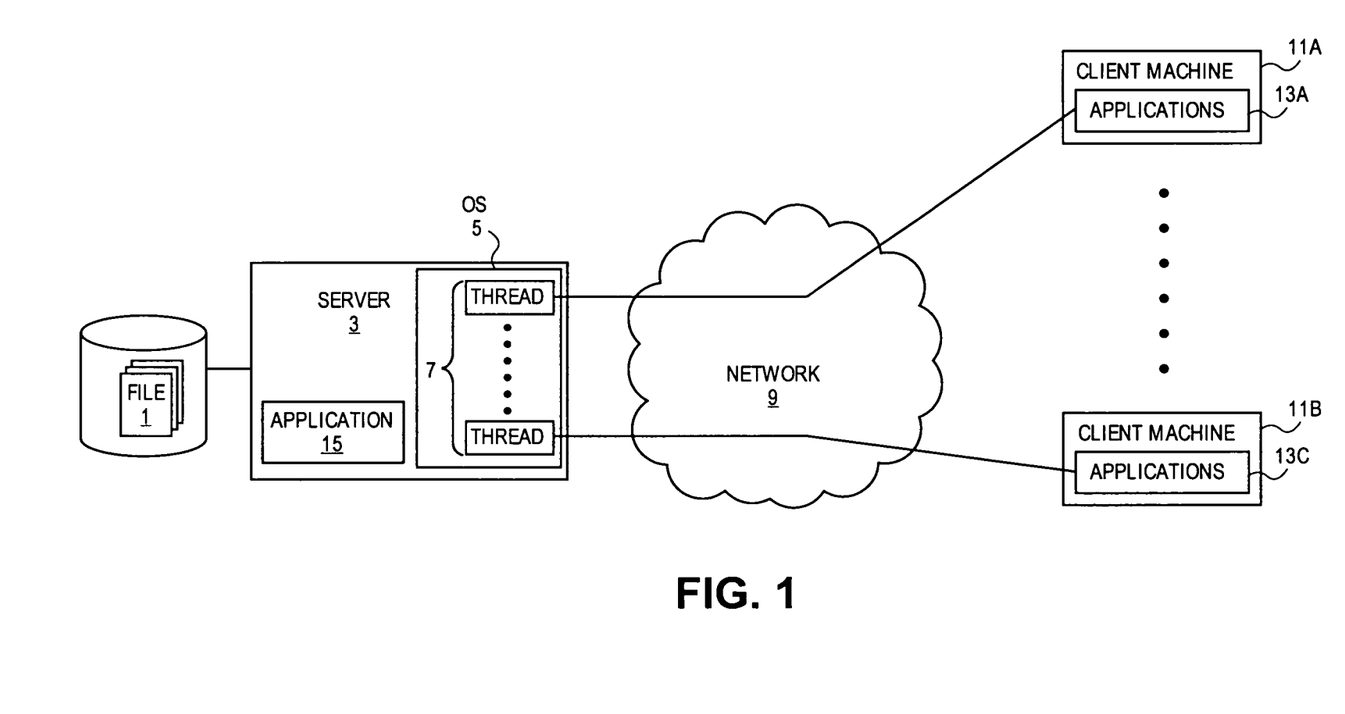
FIG. 1 is a diagram of a computer system that utilizes a sendfile operation.

A sendfile operation is an operation commonly supported by operating systems 5 such as the Linux and UNIX operating systems, as illustrated in FIG. 1. The sendfile operation allows an application 15 to send a file to another computer 11A, B asynchronously. The operation utilizes a socket that has been established for communication between two applications 15, 13A,B or programs on the respective computers for the transfer of data in the form of a file 1. Data is transfered to a spool area on the target computer where the data can be retrieved when a destination application is ready to retrieve it.

A sendfile operation is an operation commonly supported by operating systems 5 such as the Linux and UNIX operating systems, as illustrated in FIG. 1. The sendfile operation allows an application 15 to send a file to another computer 11A, B asynchronously. The operation utilizes a socket that has been established for communication between two applicaitons 15, 13 A,B or programs on the respective computers for the transfer of data in the form of a file 1. Data is transfered to a spool area on the target computer where the data can be retrieved when a destination application is ready to retrieve it. A sendfile operation is initiated by the computer 3 sending the file. A thread 7 is assigned to each sendfile operation to manage the transfer of data. The data transfered is sent in chunks or packets. The thread 7 servicing the sendfile operation waits idly between the transmission of chunks, which may be delayed due to the source machine 3 or target machine 11 A,B being busy with other operations or suffering from a software or hardware failure. For example, in many instances a target machine stops responding to the sendfile operation due to an unexpected termination of the target machine or the severing of connectivity to the target machine 11 A,B and the connection between the machines is not properly closed. Also, many types of connections are used infrequently. Web browsers make requests for a web page and related data to display to a user. A considerable lag may be present between the target machine and source machine due to distance or network conditions. As a result, the thread 7 assigned to the sendfile spends a considerable amount of time idle, but consuming memory and processor resources thereby decreasing the productivity of the source machine.

Many types of applications 15 utilize sendfile operations. A webserver is an application that can utilize the sendfile operation. A web server can provide a range of resources including web pages, database access and multi-media resources over networks 9 including the Internet. These resources are accessed by various web client applications such as web browsers, specialized client applications and media players. The web server can service requests for some of these resources by using a sendfile operation. Large numbers of clients and their host machines can attempt to connect to a web server. This can require a web server to service a large number sendfile operations simultaneously thereby consuming considerable processing resources. Each sendfile operation is assigned to a separate working thread 7 to manage the transfer of requested files. Each thread requires memory and processing resources. This creates an upper limit on the number of threads and consequently the number of sendfile operations that a server can manage at one time based on the memory and processor resouces of the server machine.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Described herein is a method and apparatus for managing file transfer between two machines. The sendfile model decreases the number of threads and thereby the amount of resources consumed by connections between the source and target machines. The inactive or idle sendfile operations are assigned to a set of poller threads and a worker thread is released. A worker thread is assigned again to the sendfile operation when further action is needed, such as the transfer of the next chunk of a file. Sendfile operations that are inactive for an extended period of time can be maintained with minimum machine resources. A timeout period can be tracked to close connections of sendfile operations that are no longer in use.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be born in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying," "accepting," "assigning," "sending," "detecting," "requesting," "releasing," "ending" or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), electronically programmable read only memories (EPROMs), electronically erasable programmable read only memories (EEPROMs), magnetic or optical cards or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-accessible storage medium includes any mechanism for storing or transmitting information in a form readable by a machine (e.g., a computer). For example, a machine-accessible storage medium includes read only memory ("ROM"), random access memory ("RAM"), magnetic disk storage media; optical storage media, flash memory devices or other type of machine-accessible storage media.

Figure 2A:
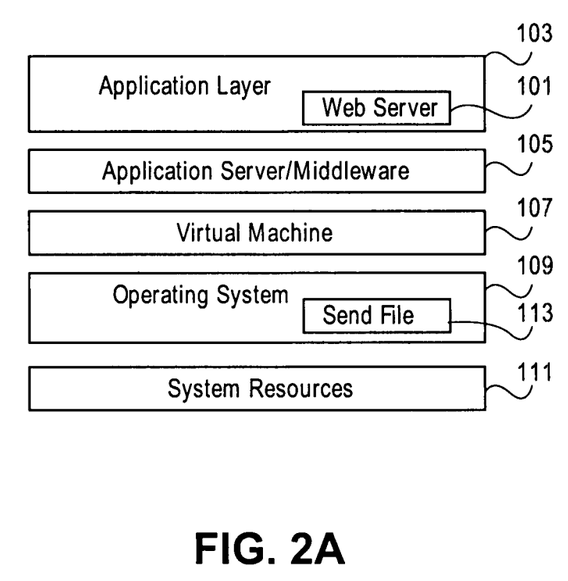
FIG. 2A is a diagram of one embodiment of a system that utilizes a sendfile operation.

FIG. 2A is a diagram of one embodiment of a system providing and utilizing a sendfile operation. The send file operation 113 is an operating system level 109 operation or program. The sendfile operation 113 can be utilized by any of the higher levels of the system including the application layer 103, application server/middleware 105, virtual machine 107 or similar layers of the system including any number of programs at each of those levels.

In one example, a web server 101 is an application layer program that utilizes the sendfile operation 113. A web server 101 is a software application that services requests for data from remote client applications over a network. The term web server is sometimes used to refer to the machine that executes the web server software and to relate to the specific handling of hypertext transfer protocol (HTTP) requests. As used herein, a web server refers to a software application for servicing requests for resources from a client that may include HTTP requests as well as other types of requests. The servicing of HTTP requests by a web server 101 will be used as an example throughout of an application that utilizes the sendfile operation 113 for sake of clarity. The servicing of HTTP requests is typically accomplished through providing hypertext markup language (HTML) documents often referred to as web pages. The servicing of these HTML requests can be done through the use of the sendfile operation 113 to transfer HTML pages and similar data to a requesting client application. One skilled in the art would understand that the sendfile operation can be used by for other file transfers and in connection with other applications.

The application layer and programs in this layer, such as web server 101, rely on a number of underlying programs and system components to support their functionality. The underlying programs include application server/middleware 105, virtual machine 107, operating system 109 and system resources 111. The application server/middleware 105 is an optional component that provides communication and data access services to applications. In another embodiment, the web server 101 is a standalone program that does not rely on an application server/middleware 105. Application servers/middleware 105 may be used to simplify the operation and maintenance of the applications it supports including the web server. The application server/middleware 105 can also be used to improve performance, security, data management and similar features.

In one embodiment, the application server/middleware 105 may run on a virtual machine 107. A virtual machine 107 is an abstraction of a platform, computer system or similar machine that applications and programs can be designed to run on without the need to program them for specific hardware configurations. A common application server and virtual machine combination is Java® 2 Enterprise Edition (J2EE) by Sun Microsystems of Santa Clara, Calif. J2EE is a platform for server programming in the Java language. J2EE provides a set of libraries that provide functionality to support fault-tolerant, distributed, multi-tier Java programs.

The virtual machine 107 relies on an operating system 109 to directly manage the resources 111 of the system through the management of processes, threads, interrupts and similar elements. Any operating system 109 can be utilized including any of the Windows® operating systems by Microsoft Corp. of Redmond, Wash., the Unix® operating system, the Linux operating system, OS X by Apple, Inc. of Cupertino, Calif. or similar operating systems. The operating system manages the system resources 111 including memory, networking, security, file and disk management and similar aspects of a computer system or similar machine. The system resources 111 can be in any configuration, amount, size or arrangement. The system resources 111 may be those of a desktop computer, server, mainframe, cluster or similar system or group of systems.

Figure 2B:
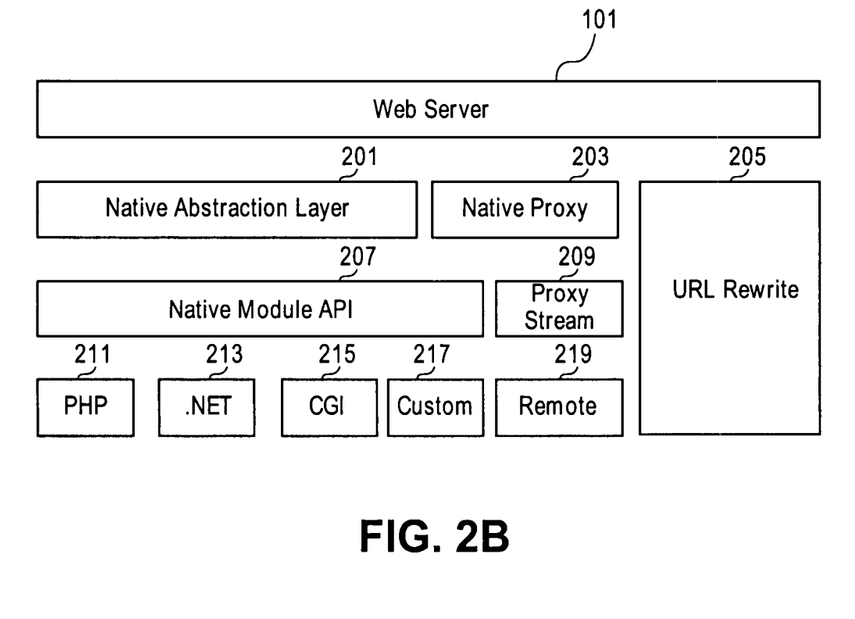
FIG. 2B is a diagram of one embodiment of an example organization of web server related modules.

FIG. 2B is a diagram of one embodiment with an example detailed organization of web server related modules. The web server 101 resides at the application layer, while other modules reside at the application layer or application server/middleware level. A web server 101 is composed of a set of modules or relies on a set of related modules. The illustrated web server 101 design is one example embodiment of an application that utilizes the sendfile operation. One of ordinary skill in the are would understand that other applications and programs can utilize the sendfile operation. Also, many of the illustrated components could be omitted and other similar components could be added depending on the requirements of the administrator of the web server 101.

The web server may be divided into its main functionality, a web server application 101, and the supporting components. The main functionality of the web server 101 is to handle HTTP requests and similar requests. However, these requests can sometimes rely on other components in order to determine a response or completely process an HTTP request. The supporting components can include a native abstraction layer 201, native proxy 203, uniform resource locator (URL) rewrite module 205, native module advance programmer interface (API) 207, proxy stream 209, PHP module 211, .Net module 213, CGI module 215, a custom module 217, a remote module 219 or similar modules.

The native abstraction layer 201 is a set of libraries that abstract operating system functionality. This allows the web server 101 to be programmed without the need for the code to be specific to a particular operating system. Instead the web server 101 utilizes the procedures and methods of the native abstraction layer, which then affect the desired functionality by interaction with the operating system.

The native proxy module 203 is an abstraction that provides the web server 101 with access to legacy subsystems. The native proxy module 203 provides out of process execution and procedure calls for external processes or across different virtual machines. This increases the overall security by allowing the execution of application code under different security contexts than the one used by the web server 101.

The uniform resource locator (URL) rewrite module 205 is a rule-based rewriting engine (based on a regular-expression parser) that rewrites requested URLs on the fly. It supports an unlimited number of rules and an unlimited number of attached rule conditions for each rule to provide a flexible and powerful URL manipulation mechanism. The application of these URL manipulations can be contingent on any number of conditions or parameters, for instance web server variables, operating environment variables, received HTTP headers, time stamps and external database lookups. URL rewrite module 205 services are typically used to replicate or service web servers that map URLs to a file system. The URL rewrite module 205 may also be used to make website URLs more user friendly, prevent in-line linking, mask the organization or working of a website.

A native module API 207 is a set of libraries that provide an abstraction layer for various legacy subsystems that are heavily reliant on HTTP. The native module API 207 is responsible for loading legacy applications inside the process address space of the running web server. Allows the web server to access and utilize older modules and resources such as native operating system modules that are specifically written to utilize this API. Native module API 207 supports modules that are written to be tightly coupled with the operating system for tasks such as logging, user authentication and authorization and similar tasks.

A proxy stream 209 is a communication protocol such as the AJP protocol or a similar protocol that also supports using operating system advanced connection mechanisms like Unix Domain Sockets or Microsoft Windows Named Pipes. The proxy stream 209 offers both connection reuse and connection multiplexing. In one embodiment, the data transferred can be encrypted, thereby improving security without the need for special network hardware or a special network topology. The proxy steam protocol gives transparent access to the out-of-process legacy subsystems that can be hosted on a remote machine.

The PHP module 211 supports the PHP scripting language that is often used to generate dynamic content for web pages. The .NET module 213 is a software component that provides a large body of pre-coded solutions to common program requirements and manages the execution of programs written specifically for the .NET framework. The common gateway interface (CGI) module 215 is a standard protocol for interfacing external application software with an information server, such as the web server. The protocol allows the web server to pass requests from a client web browser to the external application. The web server can then return the output from the application to the web browser. A custom module 217 is a module written by a user that executes within a running virtual machine using a web server module API. Custom modules 217 can be used to change the existing data delivered to the client or received from the client. Custom modules 217 can be stacked in such a way that output from one c 217 ustom module is input to another custom module 217. A remote module 219 is a custom module written by a user that executes outside a running virtual machine using the virtual machine's own remote procedure calling API.

Figure 3:
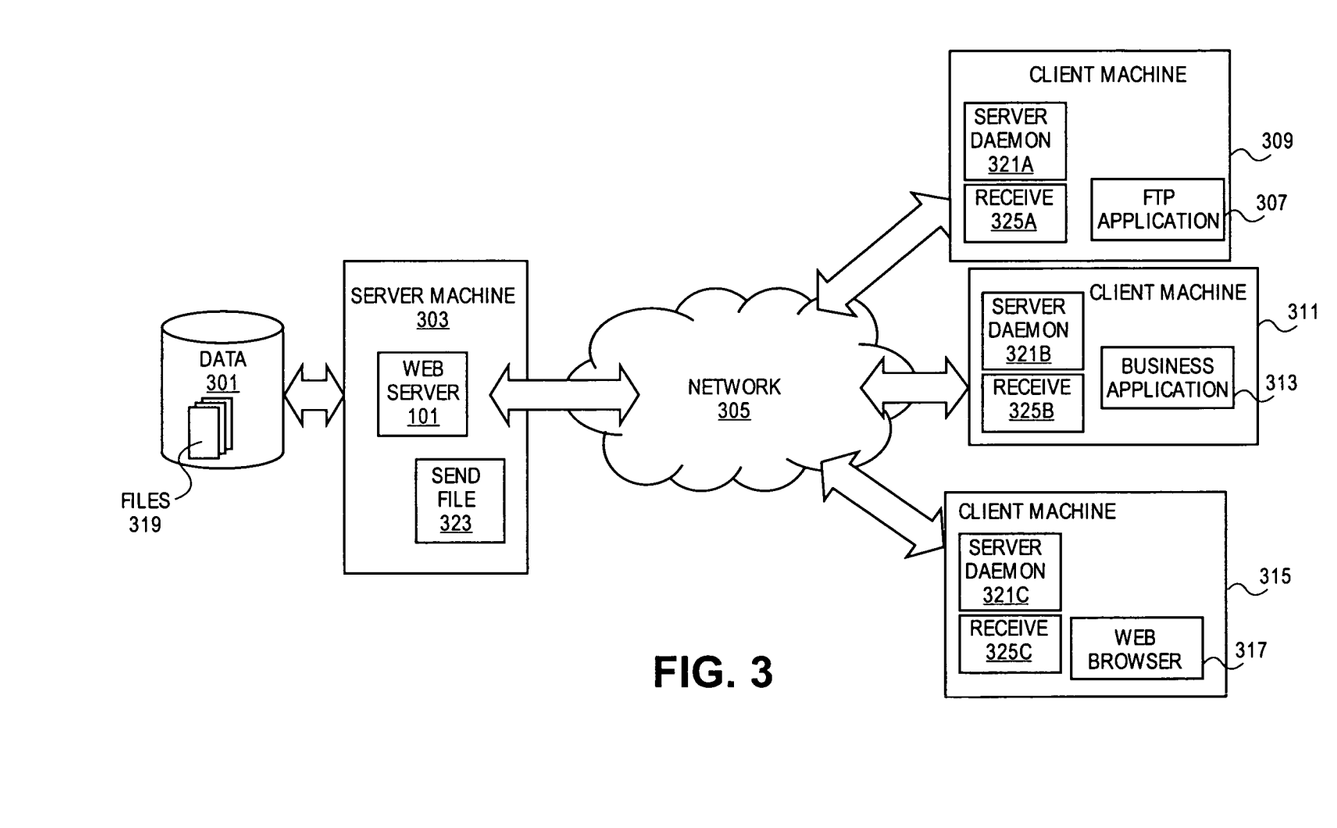
FIG. 3 is a diagram of one embodiment of a network over which sendfile operations are supported.

FIG. 3 is a diagram of one embodiment of a network for providing file transfer services. In one embodiment, a sendfile program 323 is available on a server machine 303 or similar machine such as a desktop computer, laptop computer, handheld device, console device or similar machine. The server machine 303 provides a resource to other machines over a network 305. In one example, a web server 101 is executed by a server machine or set of server machines 303. The server machine 303 may also execute other applications and programs that utilize the sendfile program 323, including applications and programs that support the web server 101 such as database management programs, virtual machines, application servers, and similar programs. The send file program 323 is a program that is accessible to other applications such as the web server 101 on the server machine 303. The sendfile program 323 can transmit a specified file 319 over a connection such as a socket to a client computer 309, 311, 315. In one embodiment, the server machine 303 is in communication with a storage device 301 to store data to be accessed and utilized by the web server 101 and associated programs. The data may be stored in a database, file system or similar data structure. The database may be a relational database, object oriented database or similar database. Any number of files 319 can be stored in the storage device 301 including web page files, software components, documents and similar files.

The server machine 303 is in communication with a set of client machines 309, 311, 315 over a network 305. The network 305 can be any type of network including a local area network (LAN), wide area network (WAN), such as the Internet, or similar network. The network 305 could be a private or public network and include any number of machines in communication with one another through any number and combination of communication mediums and protocols.

The web server 101 or similar resource provisioning application, depending on the type of resource offered, can service requests from any number or type of clients including web browsers 317, business applications 313, file transfer protocol (FTP) application 307 and similar applications. These applications open connections with the web server 101 to send requests such as requests for files. These requests can be serviced using the sendfile 323 program. The sendfile program 323 sends a requested file in chunks to a server daemon 321A-C on the requesting client machine 309, 311, 315. The received data is stored by the server daemon 321A-C in a spool area or similar temporary storage area. The destination applications can then retrieve the received data through a receive program 325A-C thereby providing an asynchronous transfer system. The connections are then closed when the client application has received the information it requires. A web server 101 utilizes separate sendfile connections for each client that connects to the web server 101 and requests a web page or similar resource.

Figure 4:
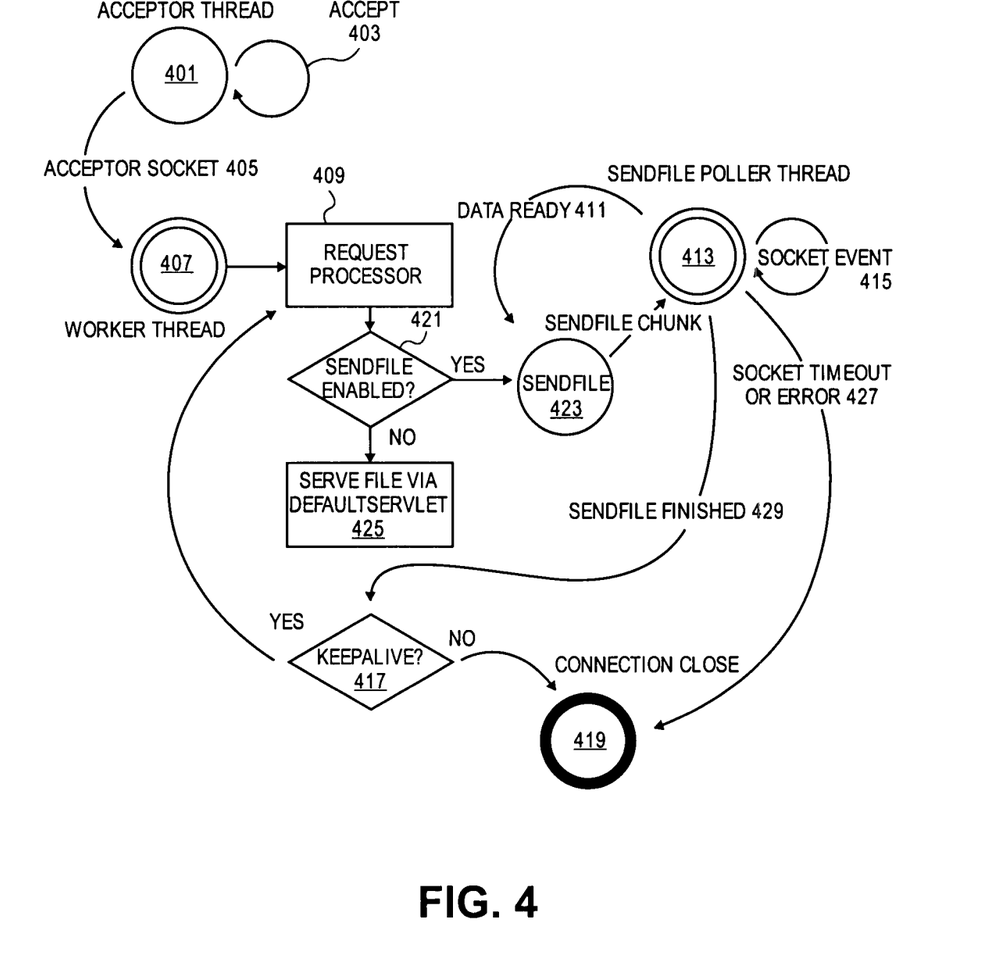
FIG. 4 is a flowchart of one embodiment of a sendfile operation model.

FIG. 4 is a flowchart of one embodiment of a sendfile model. The sendfile model is the method by which the server and sendfile program handles incoming connection requests and file transfer requests on those connections. The process of servicing a client is initiated through an acceptor thread (block 401). A thread of execution (a 'thread' as used herein) is created by an operating system to execute a program or a portion of a program. The acceptor thread continually looks for incoming connection requests on ports of the server system (block 403). The acceptor thread may poll ports or handle specified interrupts generated by these ports. The acceptor thread accepts an incoming connection request as a socket or similar connection mechanism (block 405). One skilled in the art would understand that the sendfile operation can be implemented for use with any connection protocol such as sockets, pipe or similar connection mechanisms. Sockets are used as an example herein for sake of clarity. The accepted socket is assigned to a worker thread (block 407).

Each accepted socket initially has its own worker thread to handle the transfer of data over the connection. The worker thread handles all of the transfers of data, which may include transferring files in support of HTTP requests and similar types of data requests and which allows the server applications such as the web server to provide an appropriate response by transfer or requested files. To execute this transferring of the requested data, the worker thread requests or is scheduled to a processor of the server machine (block 409). The server machine can have any number of processors and generally the operating system handles the scheduling of the process and threads to available processors.

After the worker thread has been scheduled to the processor a check is made to determine if the sendfile operation is enabled for requested data (block 421). If the sendfile operation is not enabled, then the file is transferred via a default servlet (block 425). A default servlet can be utilized to affect the file transfer in place of the sendfile operation by reading blocks of data from the file and sending them to the client. By reading the chunks instead the entire file the memory usage of the web server can be tuned and kept within desired limits.

If sendfile support is enabled, then a first chunk of the file is sent through the socket to a target computer (block 423). Sendfile can send any size chunk and disaggregates the file into specified data chunk sizes to facilitate transfer over a socket. The parameters can be specified by a user or application to determine the size of the chunks of data transmitted by the sendfile operations. The next chunk is not sent until an acknowledgment of the last chunk being successfully transferred is received from the target machine.

After the first chunk has been sent, the sendfile operation is assigned to a poller thread or set of poller threads that poll ports and sockets to detect socket events (block 413). Any number of sendfile operations can be assigned to a poller thread or set of poller threads. The worker thread is released thereby freeing up the resources associated with the worker thread. The poller thread or set of poller threads is shared amongst all of the sendfile operations that are idle and awaiting a socket event to continue execution (block 415). A socket event can be an acknowledgment signal or request for further data to be sent or similar signal or message. If data is ready to send and the target machine ready to receive it, then the sendfile operation is again assigned to a worker thread and processor resources are requested and the next chunk of data is sent (block 411).

A sendfile operation being assigned to a poller thread starts a timeout process. The timeout process detects sendfile operations and associated connections that have terminated improperly. For example, a target machine may lose connectivity, be shut down or fail without completion of the sendfile operation and closure of the connection. If a sendfile operation is idle for a predetermined amount of time, then the timeout process generates a timeout signal or error (block 427). The connection is then closed to free the associated resources (block 419).

If a sendfile operation completes (block 429), then a check is made to determine whether a connection is to be kept alive (block 417). The keepalive check can determine whether further files are to be sent via the sendfile operation or similar conditions exist that require the connection to be kept open and/or the sendfile operation to continue execution. If it is determined that the connection is no longer needed, then the connection is closed (block 419). Closing the connection frees the thread assigned to the connection. If further files have been scheduled for the sendfile operation or connection, then the sendfile operation is assigned to a worker thread and requests processor resources to continue file transfers. If it is determined that he connection is not to be closed, but there is no further data to process currently, then the sendfile operation can be assigned to the poller thread (block 413).

While the machine-accessible storage medium is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories and optical and magnetic media.

Thus, a method and apparatus for managing a sendfile model has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method comprising:
   accepting a file transfer request by an acceptor thread, the file transfer request comprising a request to transfer a file to a requestor;
   assigning the file transfer request to a first worker thread, the first worker thread to process the transfer of the file to the requestor;
   in response to assigning the file transfer request to the first worker thread, releasing the acceptor thread;
   disaggregating the file into a plurality of portions and sending a first portion of the plurality of portions of the file to the requestor;
   in response to sending the first portion, assigning, by a computer processor, the file transfer request to a shared poller thread, the shared poller thread to detect a socket event and shared by a plurality of file transfer requests; and
   in response to assigning the file transfer request to the shared poller thread, releasing the first worker thread so that the first worker thread is available to perform another operation.

2. The method of claim 1, further comprising:
   detecting a completion of a file transmission.

3. The method of claim 1, further comprising:
   requesting a processor by the worker thread to service the file transfer.

4. The method of claim 1, further comprising:
in response to the shared poller thread detecting a socket event, assigning the file transfer request to a second worker thread; and
sending a second portion of the file to the requestor.

5. The method of claim 1, further comprising:
detecting support in the request for a sendfile operation.

6. The method of claim 1, further comprising:
ending the file transfer in response to a time out expiration.

7. A non-transitory machine readable storage medium, having instructions stored therein, which when executed, cause a processor to perform operations comprising:
accepting a file transfer request by an acceptor thread, the file transfer request comprising a request to transfer a file to a requestor;
assigning the file transfer request to a first worker thread, the first worker thread to process the transfer of the file to the requestor;
in response to assigning the file transfer request to the first worker thread, releasing the acceptor thread;
disaggregating the file into a plurality of portions and sending a first portion of the plurality of portions of the file to the requestor;
in response to sending the first portion, assigning, by the processor, the file transfer request to a shared poller thread, the shared poller thread to detect file transfer events and shared by a plurality of file transfer requests; and
in response to assigning the file transfer request to the shared poller thread, releasing the first worker thread to that the first worker thread is available to perform another operation.

8. The non-transitory machine readable storage medium of claim 7, the operations further comprising:
determining whether a sendfile operation has completed.

9. The non-transitory machine readable storage medium of claim 7, the operations further comprising:
requesting a processor by the first worker thread to service the file transfer.

10. The non-transitory machine readable storage medium of claim 7, the operations further comprising:
in response to the shared poller thread detecting a socket event, assigning the file transfer request to a second worker thread.

11. The non-transitory machine readable storage medium of claim 7, the operations further comprising:
ending the sendfile operation in response to a time out expiration.

* * * * *